(12) United States Patent
Manchanda (10) Patent No.: US 8,140,246 B1
(45) Date of Patent: Mar. 20, 2012

(54) METHOD AND SYSTEM FOR DETECTING A PRESENCE OF A BLOCK HEATER IN AN AUTOMOBILE

(75) Inventor: Ashim Manchanda, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/911,669

(22) Filed: Oct. 25, 2010

(51) Int. Cl.
*F01P 5/14* (2006.01)
*F02D 41/22* (2006.01)

(52) U.S. Cl. ............ 701/107; 701/113; 123/41.15

(58) Field of Classification Search ........... 123/41.14, 123/41.15, 142.5 R, 142.5 E, 198 D; 701/113, 701/107
See application file for complete search history.

(56) References Cited

U.S. PATENT DOCUMENTS

| | | | |
|---|---|---|---|
| 5,507,251 A | 4/1996 | Hollis | |
| 5,669,337 A * | 9/1997 | Drouillard | 123/41.15 |
| 5,781,877 A | 7/1998 | Rachel et al. | |
| 6,128,948 A | 10/2000 | Shi et al. | |
| 6,302,065 B1 | 10/2001 | Davison | |
| 6,393,357 B1 | 5/2002 | Holmes et al. | |
| 6,445,997 B2 | 9/2002 | Thomas | |
| 6,463,892 B1 | 10/2002 | Russell | |
| 6,665,608 B2 * | 12/2003 | Wakahara et al. | 701/114 |
| 6,714,854 B2 | 3/2004 | Linenberg et al. | |
| 6,732,025 B2 | 5/2004 | Reese, II et al. | |
| 6,848,434 B2 | 2/2005 | Li et al. | |
| 6,931,865 B1 | 8/2005 | Van Gilder et al. | |
| 7,147,366 B2 | 12/2006 | Melby et al. | |
| 7,277,791 B2 | 10/2007 | Petrosius et al. | |
| 7,418,322 B2 | 8/2008 | Kariya et al. | |
| 7,429,128 B2 | 9/2008 | Izumiura et al. | |
| 7,445,383 B2 | 11/2008 | Huttenlocher et al. | |
| 7,757,649 B2 * | 7/2010 | Wakahara | 123/142.5 E |
| 7,975,536 B2 * | 7/2011 | Bommer et al. | 73/114.68 |
| 2009/0182489 A1 | 7/2009 | Yang et al. | |
| 2009/0319162 A1 | 12/2009 | Bommer et al. | |

\* cited by examiner

*Primary Examiner* — Hai Huynh
(74) *Attorney, Agent, or Firm* — Snell & Wilmer LLP (57) ABSTRACT

The present invention relates to a method and system for detecting a presence of a block heater in an automobile. In one embodiment, an automobile includes an engine, a radiator, an engine coolant temperature ("ECT") sensor, and/or an engine control unit ("ECU"). The radiator delivers coolant to the engine to cool the engine. The ECT sensor is located in a path of the coolant and determines ECT data. The ECU determines a temperature difference between a current maximum temperature of the engine coolant temperature data at a first time period and a current minimum temperature of the engine coolant temperature data at a second time period after the first time period. When the temperature difference is greater than a predetermined temperature threshold, the ECU determines that the block heater is present. When the block heater is present, the ECU masks any engine malfunction detections.

20 Claims, 8 Drawing Sheets

| Automobile | ECT-IAT | Temperature Difference, Δt |
|---|---|---|
| Model A | 12.5 | 2.5 |
| Model B | 19.375 | 3.75 |
| Model C | 13.75 | 3.125 |
| Model D | 19.375 | 3.75 |
| Model E | 19.375 | 3.125 |

METHOD AND SYSTEM FOR DETECTING A PRESENCE OF A BLOCK HEATER IN AN AUTOMOBILE

BACKGROUND

1. Field

The present invention relates to a method and system for detecting a presence of a block heater in an automobile.

2. Description of the Related Art

In a conventional automobile, a block heater is an accessory used to heat an engine block, in geographic regions with cold temperatures. Heating the engine block can ease starting an engine. However, heating the engine block with a block heater generally raises an engine coolant temperature ("ECT") of coolant to a much greater extent than an intake air temperature ("IAT") of intake air used for combustion in the engine. This results in a temperature differential between the IAT and the ECT.

Figure 1:
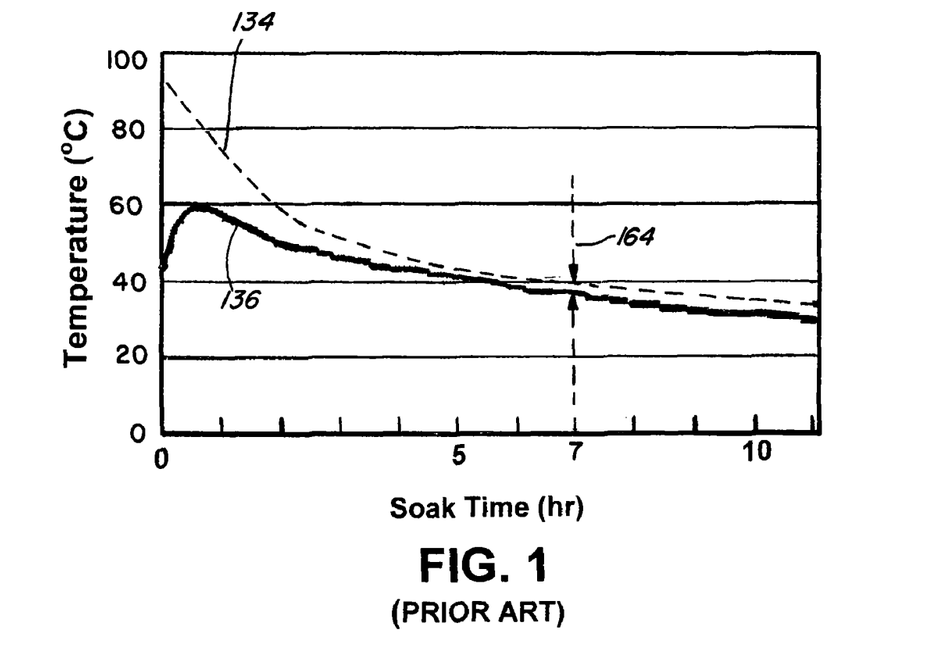
FIG. 1 depicts a graph of engine coolant temperature and intake air temperature for an automobile.

This temperature differential can result in the false detection of a malfunction by the engine control unit (ECU). Under normal conditions, i.e. without the use of a block heater, the ECT and the IAT normalize towards each other after a relatively long soak time of 7 hours with the engine off as seen in FIG. 1. Taking advantage of this characteristic, a malfunction is detected when the ECT-IAT is not in the specified range after a 7 hour soak. In FIG. 1, a curve 134 represents the ECT, while a curve 136 represents the IAT. As can be seen, the ECT and the IAT gravitate towards each other after 7 hours of soak time as indicated by arrows 164. However, when a block heater is used, the ECT and the IAT diverge. Therefore, to prevent detection of a diagnostic trouble code (which indicates an engine malfunction), a presence of a block heater must be detected.

Figure 2:
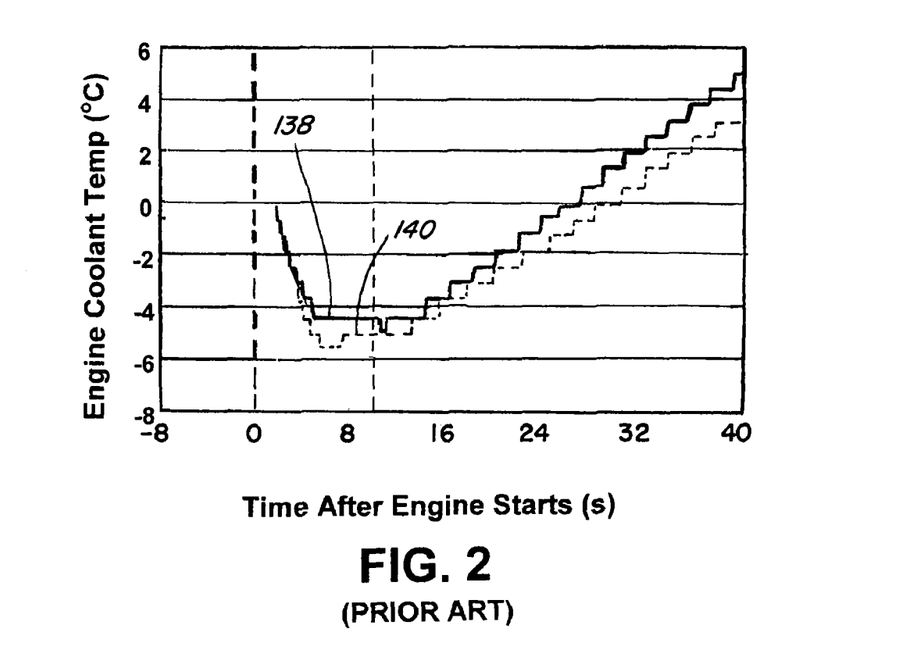
FIG. 2 depicts a graph of engine coolant temperature for multiple automobiles.

Conventional methods for determining engine malfunctions have tried to determine the presence of the block heater by checking for a temperature difference in the ECT after a period of time. For example, as seen in FIG. 2, one conventional method of determining whether a block heater exists includes taking a temperature difference of the ECT from the start of the engine and at some time afterwards. In FIG. 2, a curve 138 represents an ECT for a first automobile and a curve 140 represents an ECT for a second automobile. As can be seen, in both situations, after 10 seconds, there is a temperature difference in the ECT from the start of the engine and after 10 seconds has lapsed. When the temperature difference is sufficiently large such as 3° C., this indicates that there is a block heater. The conventional methods are dependent on the relative position of the ECT sensor relative to the block heater.

However, these conventional methods can be inadequate depending on the configuration of the automobile and/or the placement of the block heater. For example, in some automobiles, depending on the placement of the ECT sensor, the ECT actually rises before falling and then rises again. This can occur, for example, when the block heater raises the temperature of the coolant used to cool the engine, and which are stagnant near the engine when the engine is off. When the engine is started, the coolant circulates through the engine and radiator hoses, and the ECT sensor initially comes into contact with the coolant that was stagnant near the engine, and which has been warmed by the block heater, resulting in an increase in the ECT. As the coolant further circulates, coolant which was not warmed by the block heater comes into contact with the ECT sensor, lowering the ECT detected by the ECT sensor. As the engine is fully operational, the ECT again begins to rise.

Figure 3:
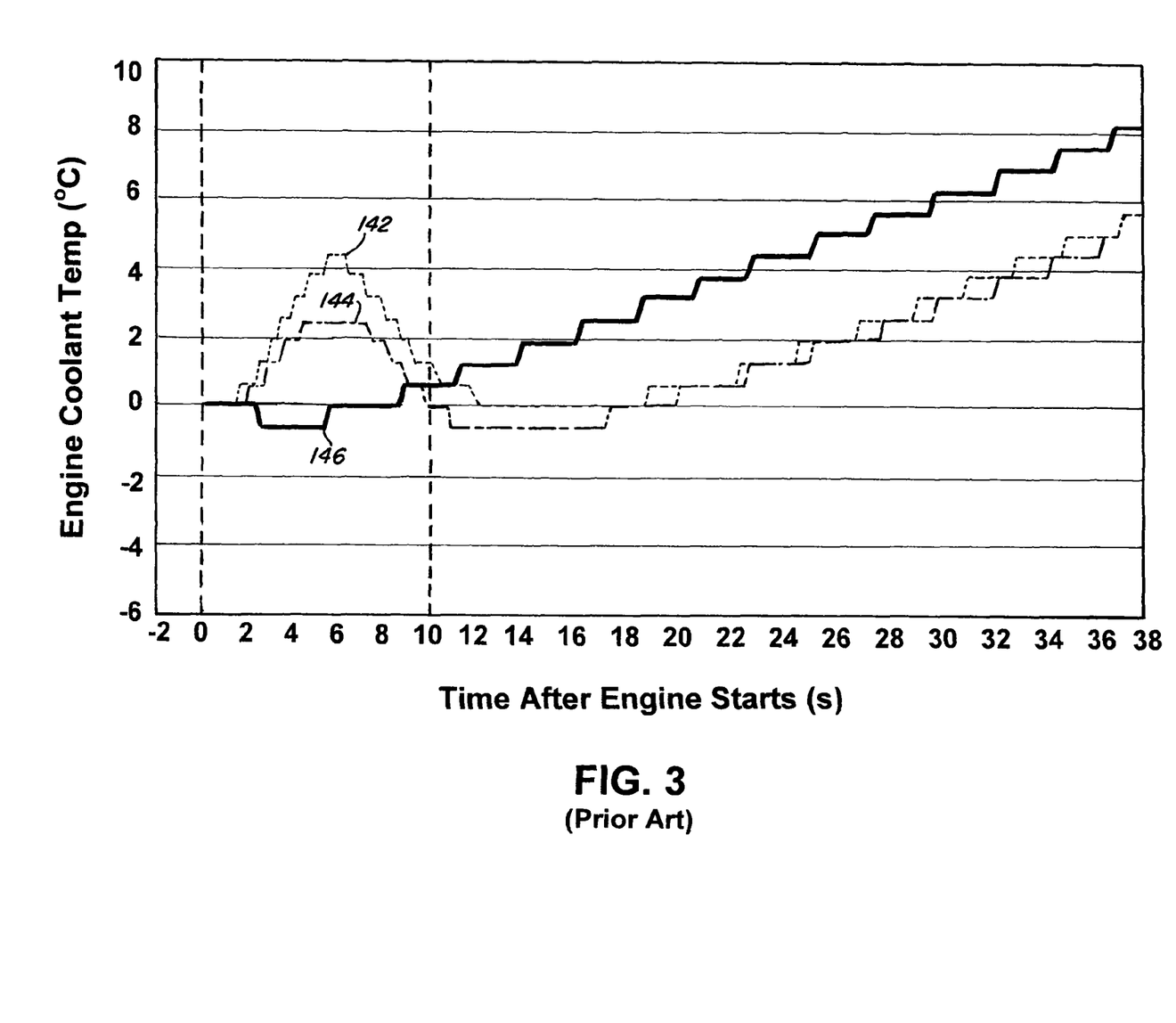
FIG. 3 depicts a graph of engine coolant temperature for automobiles with a block heater present and without a block heater present.

This can be seen, for example, in FIG. 3, the curve 142 represents the ECT for a third automobile and the curve 144 represents the ECT for a fourth automobile. A curve 146 represents an automobile without a block heater. In such a situation, after 10 seconds, the temperature difference from the ECT at the start of the engine to the ECT at 10 seconds is small, such as 1° C. Using the conventional method, this would indicate that the block heater was not present, and can result in a false indication of an engine malfunction.

Thus, there is a need for a method and system for detecting a presence of a block heater in an automobile.

SUMMARY

The present invention relates to a method and system for detecting a presence of a block heater in an automobile. In one embodiment, the present invention includes an automobile including an engine, a radiator, an engine coolant temperature ("ECT") sensor, an intake air temperature ("IAT") sensor, and/or an engine control unit ("ECU"). The radiator delivers coolant to the engine to cool the engine. The engine cooling system also includes a fan which forces air over the radiator to cool the coolant. The ECT sensor is located in a path of the coolant while the IAT sensor is located in a path of intake air supplied to the engine to facilitate combustion. The ECT sensor determines ECT data while the IAT sensor determines intake air data.

The ECU determines a temperature difference between a current maximum temperature of the engine coolant temperature data at a first time period and a current minimum temperature of the engine coolant temperature data at a second time period after the first time period. The detection of the current minimum temperature at a time period after the current maximum temperature allows for the ECT to initially rise and to still maintain an accurate detection of the presence of the block heater.

When the temperature difference is greater than a predetermined temperature threshold, the ECU determines that the block heater is present. Otherwise, the ECU determines that the block heater is not present. When the block heater is not present, the ECU detects a malfunction caused by a temperature difference between the ECT and the IAT. However, when the block heater is present, the ECU masks detection of that malfunction.

In one embodiment, the present invention is a method for detecting an engine malfunction including detecting, using an engine coolant temperature sensor, engine coolant temperature data, determining, using an engine control unit, a maximum temperature of the engine coolant temperature data at a first time period, determining, using the engine control unit, a minimum temperature of the engine coolant temperature data at a second time period after the first time period, determining, using the engine control unit, a temperature difference between the maximum temperature and the minimum temperature, determining, using the engine control unit, a presence of a block heater using the temperature difference, detecting, using the engine control unit, an engine malfunction, when the block heater is determined to not be present, and masking, using the engine control unit, the detection of the engine malfunction when the block heater is determined to be present.

In another embodiment, the present invention is a method for determining a presence of a block heater in an automobile including detecting, using an engine coolant temperature sensor, engine coolant temperature data, determining, using an engine control unit, a maximum temperature of the engine coolant temperature data at a first time period, determining, using the engine control unit, a minimum temperature of the engine coolant temperature data at a second time period after the first time period, determining, using the engine control unit, a temperature difference between the maximum temperature and the minimum temperature, comparing, using the engine control unit, the temperature difference with a predetermined temperature threshold, and determining, using the engine control unit, that the block heater is present when the temperature difference is greater than the predetermined temperature threshold.

In yet another embodiment, the present invention is an automobile including an engine including an engine block, a radiator hose connected to the engine block and configured to transport engine coolant, an engine coolant temperature sensor located in a path of the engine coolant and configured to detect engine coolant temperature data, and an engine control unit connected to the engine coolant temperature sensor. The engine control unit can be configured to determine a maximum temperature of the engine coolant temperature data at a first time period, determine a minimum temperature of the engine coolant temperature data at a second time period after the first time period, determine a temperature difference between the maximum temperature and the minimum temperature, compare the temperature difference with a predetermined temperature threshold, and determine that a block heater is present when the temperature difference is greater than the predetermined temperature threshold.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 4:
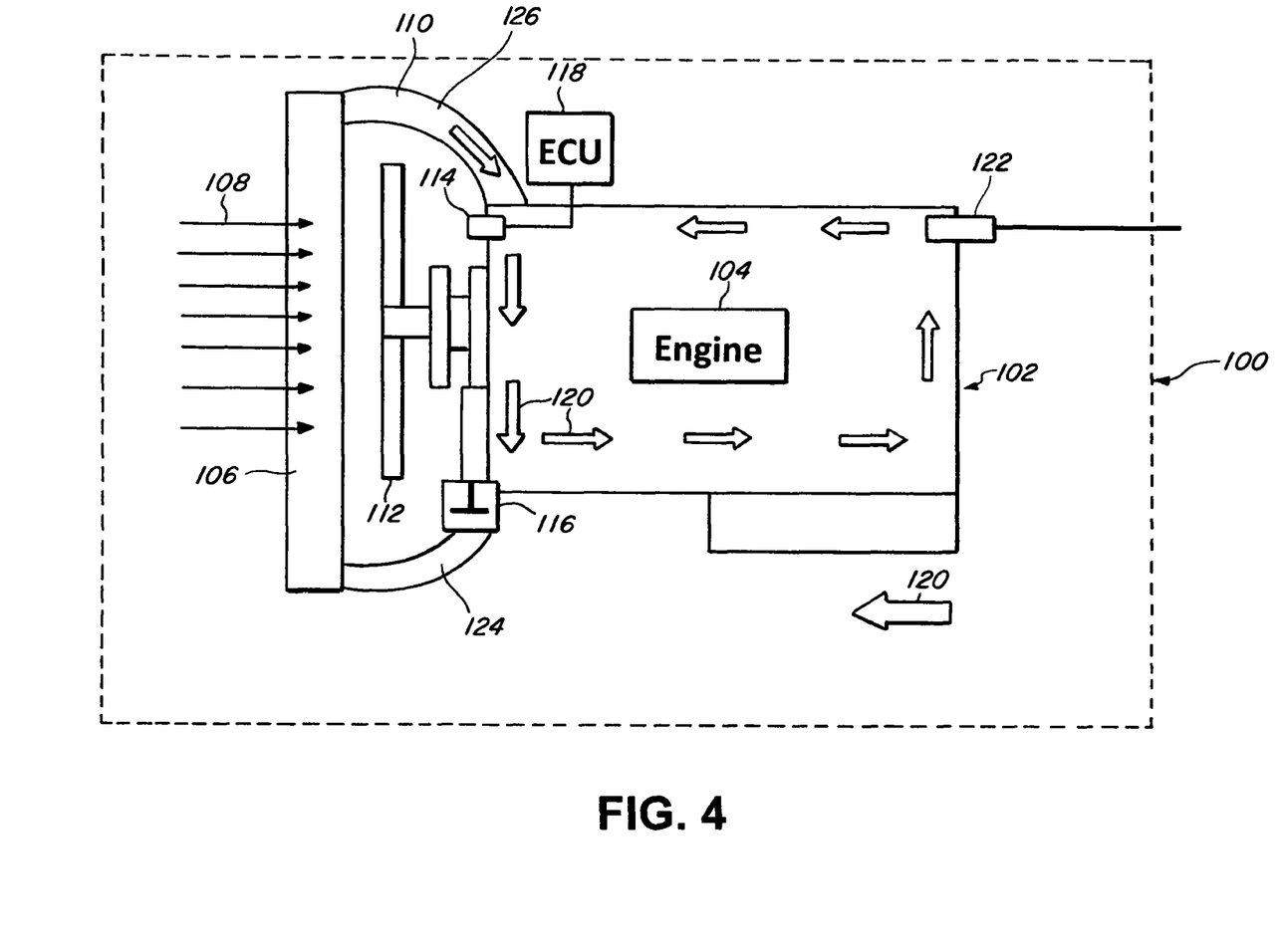
FIG. 4 depicts an automobile including a block heater according to an embodiment of the present invention.

In one embodiment, the present invention includes an automobile 100 as shown in FIG. 4. The automobile 100 includes, for example, an engine bay 102. Located inside the engine bay 102 are an engine 104, a radiator 106, an engine coolant temperature ("ECT") sensor 114, an intake air temperature ("IAT") sensor 116, and/or an engine control unit ("ECU") 118. In addition, a block heater 122 can also be used and/or located in the engine bay 102.

The radiator 106 includes, for example, radiator hoses 110 and/or a fan 112. The radiator hoses 110 can include, for example, an upper radiator hose 126, and/or a lower radiator hose 124. The fan 112 rotates to draw in air 108, which is used to cool the coolant 110 flowing through the upper radiator hose 126 and/or the lower radiator hose 124. The coolant is used, for example, to cool the engine 104 and/or components near the engine 104 as schematically indicated by arrows 120.

Figure 5:
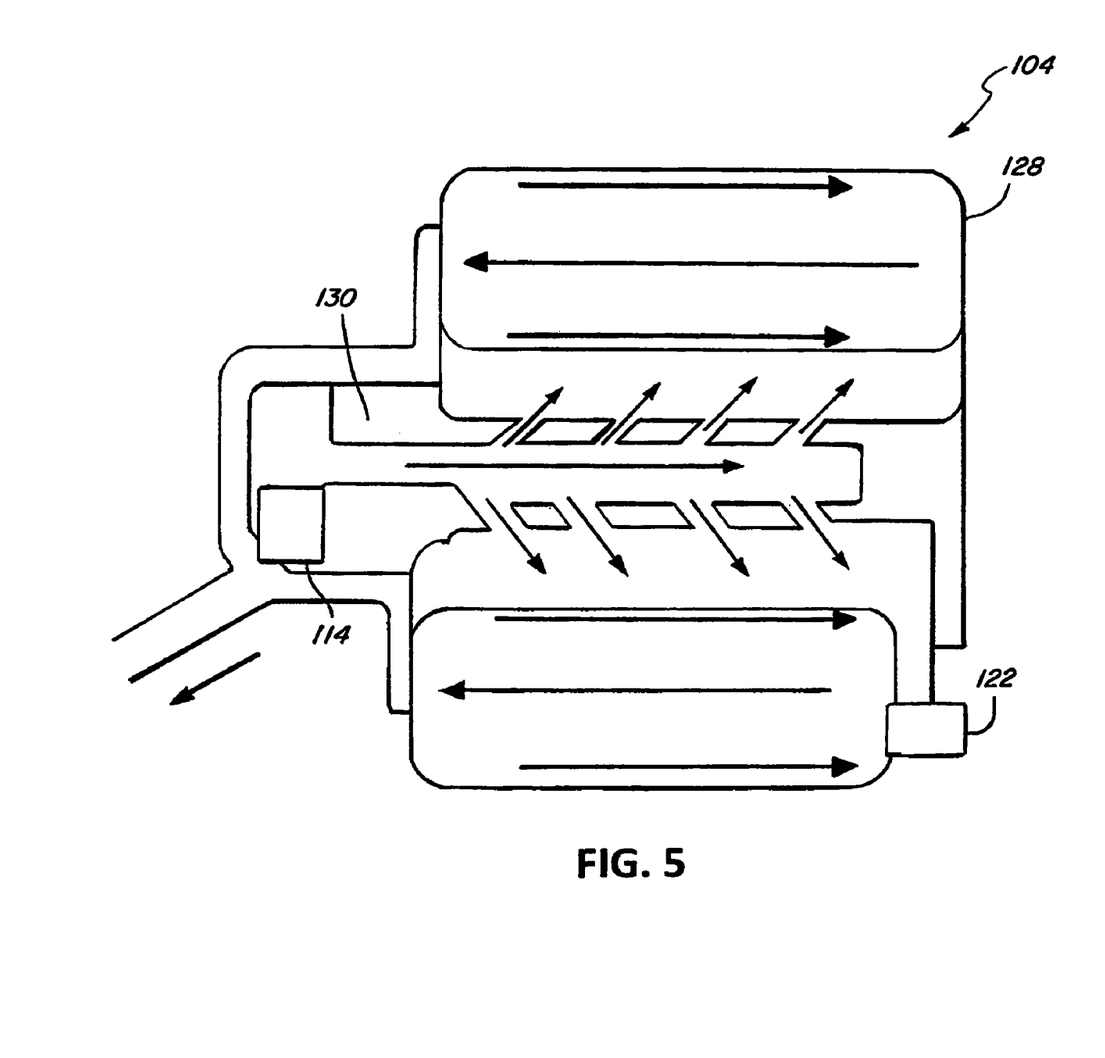
FIG. 5 depicts an engine according to an embodiment of the present invention.

The engine 104 includes for example, an engine block. The engine 104 can be warmed, by the block heater 122 in order to ease starting the engine 104. The engine 104 can also be cooled by the coolant. More specifically, the engine block can also be cooled by the coolant. As seen in FIG. 5, an engine block 128 is shown. The engine block 128 can include, for example, a coolant pump 130. In addition, in one embodiment, the ECT sensor 114 can be located in a path of the coolant on the engine block 128.

Referring back to FIG. 4, the ECT sensor 114 is located in a path of the coolant and can be used, for example, to detect engine coolant temperature data. The ECT data can indicate, for example, a temperature of the coolant. The IAT sensor 116 is located in a path of the intake air which is drawn in from an intake air system. The intake air is supplied to the engine to facilitate combustion in the engine. The IAT sensor 116 detects IAT data indicating, for example, a temperature of the intake air.

The block heater 122 can be located adjacent the engine 104 and can be used, for example, to heat the engine 104. However, during the heating of the engine 104, the block heater 122 can also heat the coolant adjacent the engine 104. This can result, for example, in an initial increase in the ECT before a gradual decrease in the ECT, when coolant begins to circulate (when the coolant pump 130 is activated from the start of the engine).

The ECU 118 receives the ECT data and/or the IAT data and can analyze the ECT data and/or the IAT data to determine if there is diagnostic trouble code ("DTC"). The DTC can indicate, for example, that an engine malfunction has taken place or is likely to take place. When there are two instances of the DTC, an engine malfunction has occurred and a malfunction indicator lamp ("MIL") or a check engine light can be activated to be viewable to the user. In one embodiment, the ECU 118 can determine the presence of the block heater 122 and mask the detection of the engine malfunction when the block heater 122 is determined to be present.

For example, the ECU 118 can determine a maximum temperature of the ECT data for a predetermined period of time and a minimum temperature of the ECT data for a predetermined period of time and determine a temperature difference between the maximum temperature of the ECT data and the minimum temperature of the ECT data. The temperature difference can be compared with a predetermined temperature threshold. When the temperature difference is greater than the predetermined temperature threshold, then the block heater 122 is present. However, when the temperature difference is not greater than the predetermined temperature threshold, then the block heater 122 is not present. In one embodiment, the predetermined temperature threshold can have a value between approximately 1.25° C. and 3.125° C. However, it is understood that the predetermined threshold value can be set at any value depending on the requirements of government regulations, and/or manufacture regulations.

To determine the maximum temperature and the minimum temperature, a current maximum temperature and a current minimum temperature can be determined. The current maximum temperature is initialized to be the ECT from the start of the engine 104. The current maximum temperature is constantly compared with the current temperature from the ECT sensor to determine if the current temperature is greater than the current maximum temperature. If the current temperature is greater than the current maximum temperature, than the current maximum temperature is updated to be the current temperature. Whenever, the current maximum temperature is updated, the current minimum temperature is also updated. This allows for a temperature difference between the current maximum and the current minimum temperature that occurs at a time period after the current maximum temperature occurs to be determined. By determining the current minimum temperature after the current maximum temperature, this reduces the effect of the initial rise in the ECT in the determination of the presence of the block heater. The temperature difference is then compared against the predetermined temperature threshold to determine if the block heater is being used.

Figure 6:
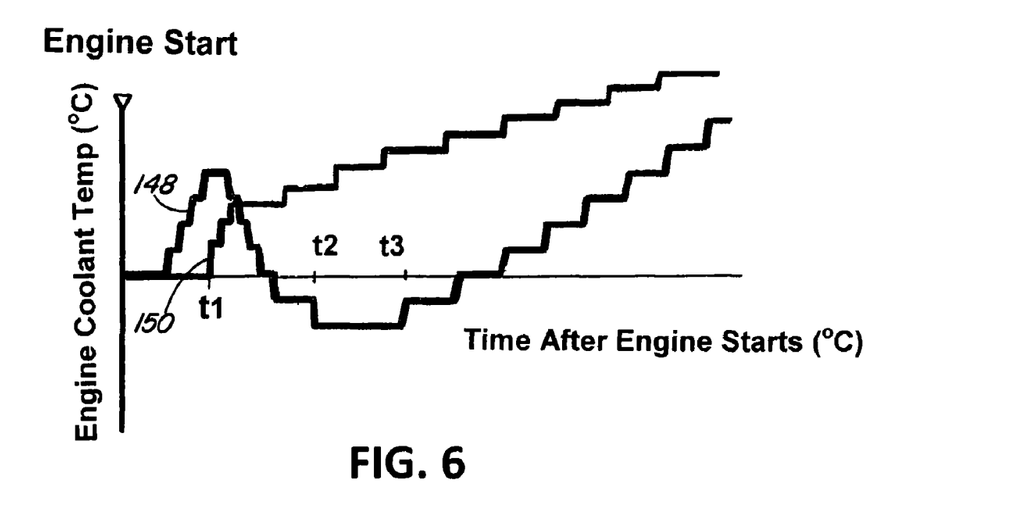
FIG. 6 depicts a graph of engine coolant temperature for an automobile with a block heater present and an automobile without a block heater present according to an embodiment of the present invention.
Figure 7:
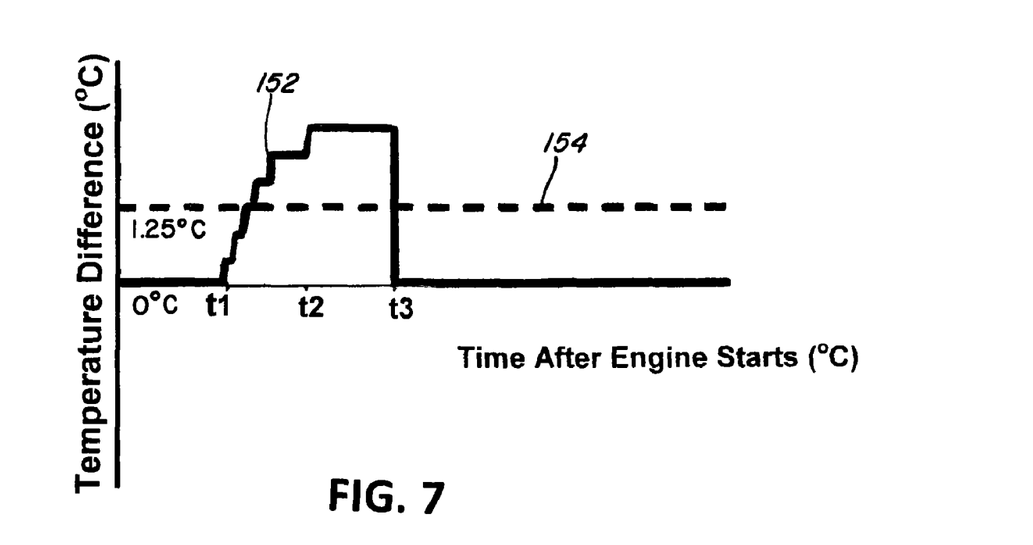
FIG. 7 depicts a graph of a temperature difference for a current maximum temperature and a current minimum temperature, and a predetermined temperature threshold according to an embodiment of the present invention.

This can be seen, for example, in FIG. 6 and FIG. 7. In FIG. 6, a curve 148 represents the ECT of the automobile 100 using the block heater 122, a curve 150 represents the ECT of an automobile that is not using the block heater 122. As can be seen, the ECT of the automobile 100 using the block heater 122 increases until time period t1, then decreases until time period t2, and thereafter increases. However, in the automobile that is not using the block heater 122, the temperature begins increasing at time period t1. In the present invention, the ECU 118 analyzes the ECT from the start of the engine through the time period t3. The ECU 118 can initialize the current maximum temperature when the engine is started. The current maximum temperature is constantly compared with the current temperature from the ECT sensor 114 to determine if the current temperature is greater than the current maximum temperature. Thus, as the ECT increases, so does the value of the current maximum temperature, until the time period t1. When the ECT decreases after the time period t1, the current maximum remains unchanged as it is greater than the current temperature.

To determine the current minimum temperature, the ECU 118 first initializes the current minimum temperature to the current temperature when the engine is started. Whenever the current maximum temperature is updated to the current temperature, the current minimum temperature is also updated to have the same value as the current maximum temperature. However, when the current maximum temperature is not updated, indicating that the current temperature is less than the current maximum temperature, the ECU 118 compares the current minimum temperature to the current temperature. If the current temperature is less than the current minimum temperature, then the current minimum temperature is updated to be the current temperature.

For example, through the time period t1, the current minimum temperature is constantly updated to be the current maximum temperature since there is a progressive increase in the current temperature. However, between the time period t1 and the time period t2, the current minimum temperature is updated to be the current temperature as the current temperature decreases. After time period t2, however, the current temperature is not less than the current minimum temperature and thus, the current minimum temperature is not updated to be the current temperature. Therefore, the current minimum temperature occurs at a time period after the current maximum temperature. At the time period t3, the ECU 118 finishes ceases updating the current maximum temperature and the current minimum temperature as the value at time period t3 is considered the maximum temperature and the minimum temperature for the ECT data from the ECT sensor 114.

The temperature difference between the current minimum temperature and the current maximum temperature can be illustrated as seen in a curve 152 in FIG. 7. If the temperature difference is greater than a predetermined threshold represented by a line 154, at time period t3, then the ECU 118 determines that the block heater 122 is present. Otherwise, the ECU 118 determines that the block heater 122 is not present. As can be seen in FIG. 7, the temperature difference is approximately 0° C. prior to the time period t1 because the current minimum temperature is updated to be the current maximum temperature when the current temperature is rising. Likewise, after time period t3, the current minimum temperature and/or the current maximum temperature may be reset.

Figure 8:
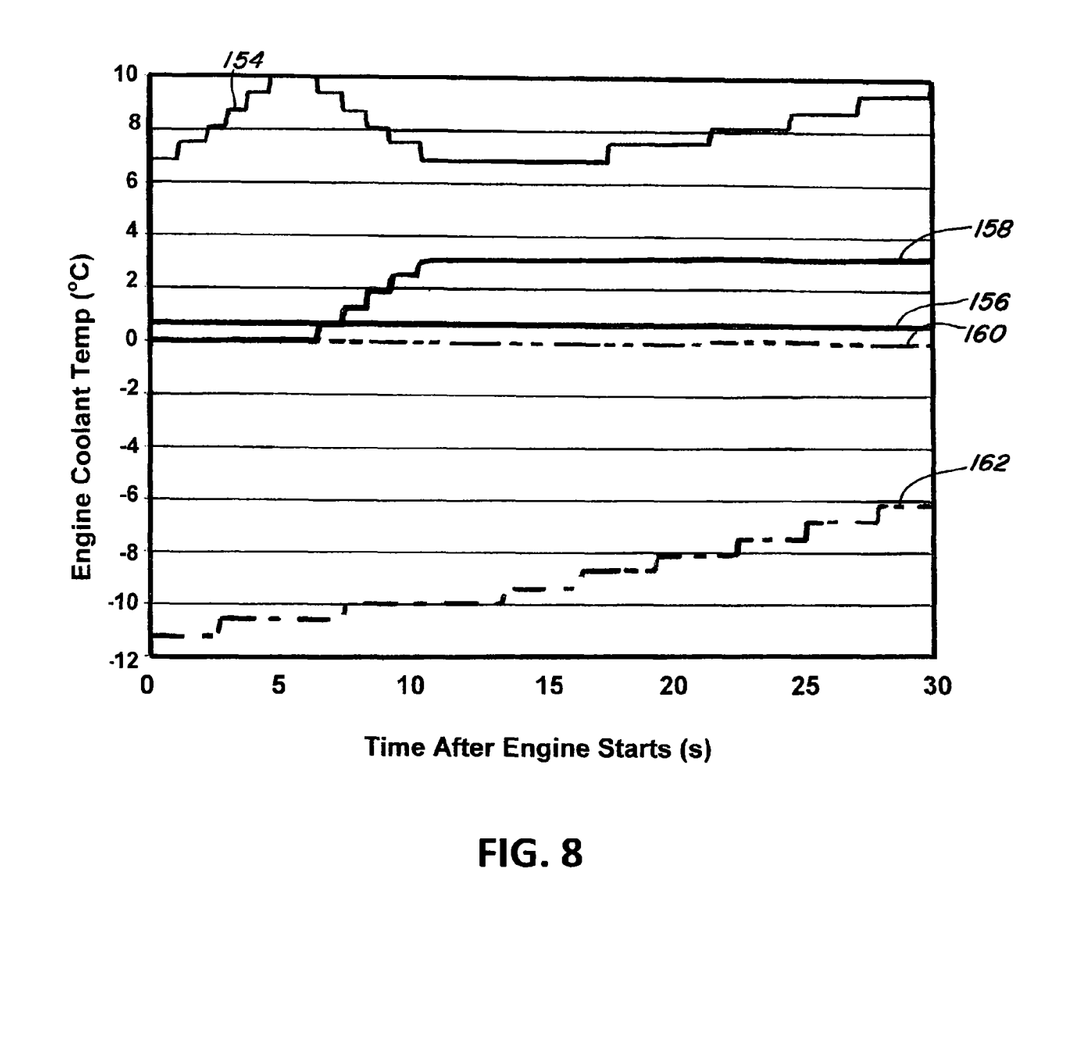
FIG. 8 depicts a graph of engine coolant temperature for an automobile with a block heater present and an automobile without a block heater present, and their respective temperature differences according to an embodiment of the present invention.

FIG. 8 depicts actual data collected from an automobile. A curve 154 represents the ECT of the automobile when it is using a block heater, while a curve 162 represents the ECT of the automobile when it is not using a block heater. A curve 158 represents the temperature differential between the current maximum temperature and the current minimum temperature for the automobile when it is using the block heater, and a curve 160 represents the temperature differential between the current maximum temperature and the current minimum temperature for the automobile when it is not using the block heater. A curve 156 represents the predetermined temperature threshold.

As can be seen in FIG. 8, the curve 158 crosses the curve 156 after the ECT in the curve 154 begins to decrease. However, the curve 160 does not cross the curve 156 because the current minimum temperature is continuously updated to be the current maximum temperature resulting in a 0° C. temperature differential. Thus, the ECU 118 can more accurately predict when the automobile is using a block heater.

Figure 10:
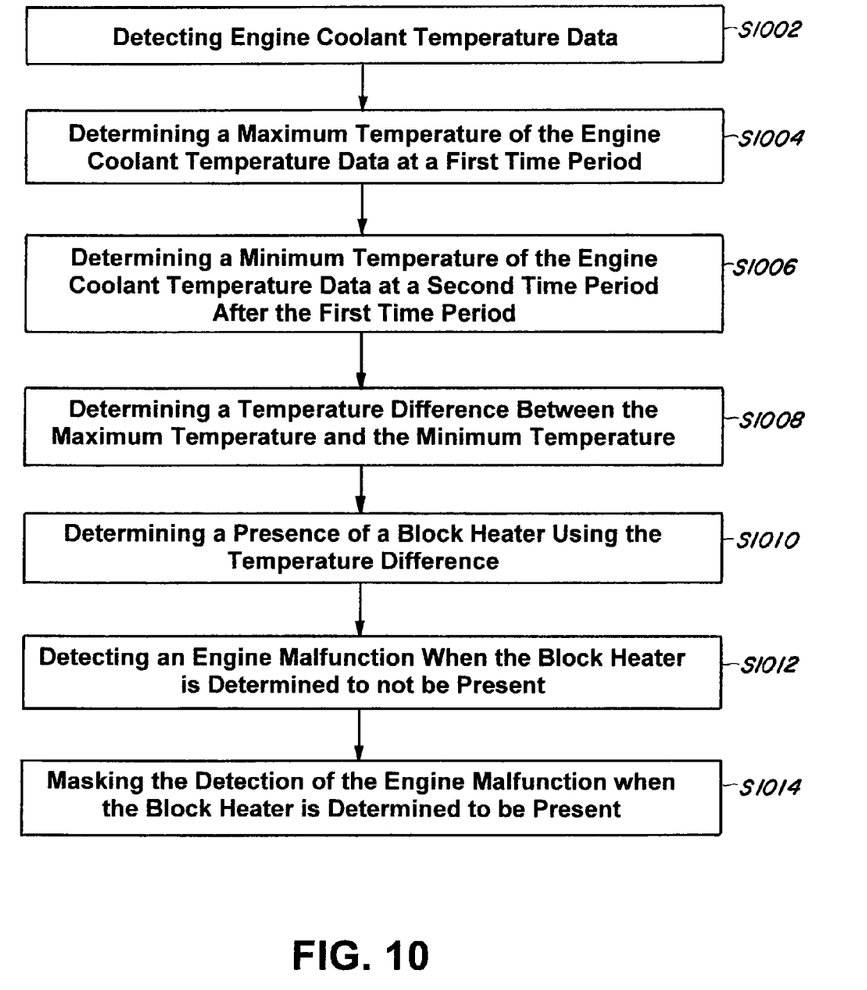
FIG. 10 depicts a process according to an embodiment of the present invention.

In one embodiment, the present invention is a process, as shown in FIG. 10. In Step S1002, engine coolant temperature data is detected. For example, the ECT sensor 114 can detect ECT data. In Step S1004, a maximum temperature of the ECT data is determined at a first time period. For example, the ECU 118 determines the current maximum temperature of the ECT data at the time period t1. In Step S1006, a minimum temperature of the ECT data at a second time period after the first time period is determined. For example, the ECU 118 determines the minimum temperature of the ECT data at the time period t2, which is after the time period t1. In Step S1008, a temperature difference between the maximum temperature and the minimum temperature is determined. For example, the ECU 118 calculates the temperature difference between the current minimum temperature and the current maximum temperature.

In Step S1010, a presence of a block heater is determined. For example, the ECU 118 can compare the temperature difference to a predetermined temperature threshold. When the temperature difference is greater than the predetermined temperature threshold, then the ECU 118 determines that the block heater is present. However, when the temperature difference is not greater than the predetermined temperature threshold, then the ECU 118 determines that the block heater is not present.

In Step S1012, an engine malfunction is detected when the block heater is determined to not be present. For example, if the ECU 118 detects an engine malfunction when the block heater is not present, a DTC is generated. When two or more DTC are generated, then the ECU 118 can control a MIL or a check engine light to be activated to be viewable to the user. In Step S1014, a detection of the engine malfunction is masked when the block heater is determined to be present. For example, if the ECU 118 detects an engine malfunction when the block heater is present, any DTC generated is masked and/or a DTC is prevented from being generated.

Figure 9:
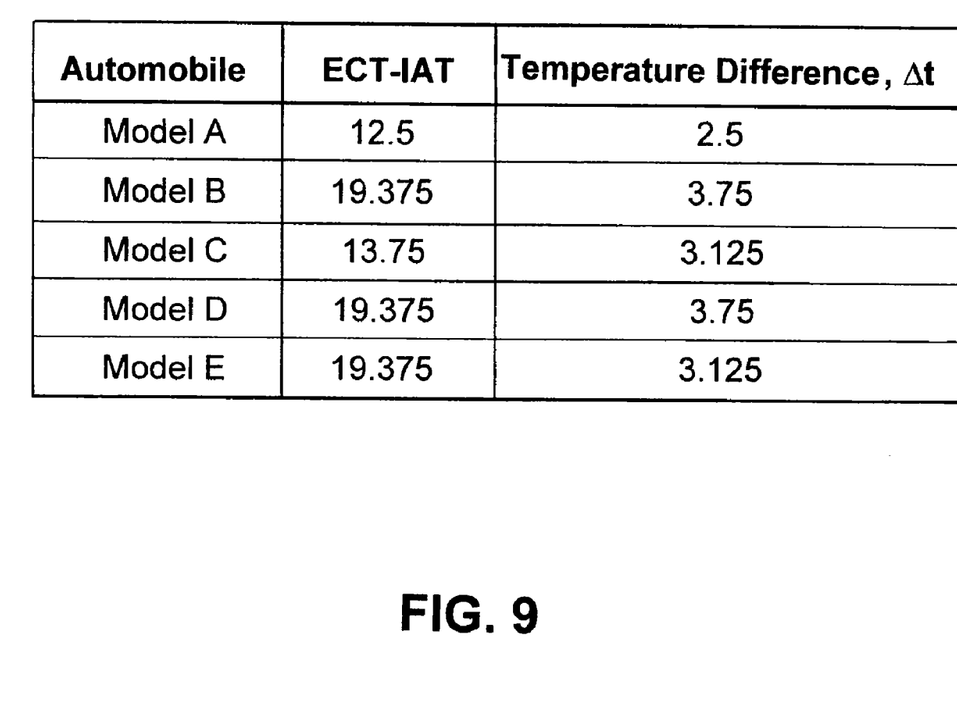
FIG. 9 depicts a table of a difference between engine coolant temperature and intake air temperature, and temperature differences for multiple models of automobiles according to an embodiment of the present invention.

Other data collected in experiments can also be seen in the table on FIG. 9. As can be seen, the difference between the ECT and the IAT and the temperature difference between the current maximum temperature and the current minimum temperature at some predetermined time $\Delta t$ are shown for automobile Model A, Model, B, Model C, Model D, and Model E are shown.

In operation, after a user has finished using his automobile 100, he can activate the block heater 122. This can commonly occur, for example, in cold geographic regions overnight. After a lengthy soak time, such as 7 hours, the user may wish to use his automobile 100. Thus, the user starts the engine 104. When the engine 104 is started, the ECU 118 can initialize the current maximum temperature and/or the current minimum temperature to be the current temperature.

When the current temperature is greater than the current maximum temperature, the ECU 118 updates the current maximum to be the current temperature. Whenever the current maximum temperature is updated, the ECU 118 updates the current minimum temperature to be the current maximum temperature. However, when the current temperature is less than the current minimum temperature, then the ECU 118 updates the current minimum temperature to be the current temperature. After a predetermined period of time, the ECU 118 calculates the temperature difference between the current maximum temperature and the current minimum temperature and compares the temperature difference to the predetermined temperature threshold. If the temperature difference is greater than the predetermined temperature threshold, the ECU 118 determines that the block heater is present. Otherwise, if the temperature difference is less than the predetermined temperature threshold, the ECU 118 determines that the block heater is not present.

Although in the examples above, only the ECT is used to determine the presence of the block heater, the IAT may also be used in addition to the ECT.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for detecting an engine malfunction comprising:

detecting, using an engine coolant temperature sensor, engine coolant temperature data;

determining, using an engine control unit, a maximum temperature of the engine coolant temperature data at a first time period;

determining, using the engine control unit, a minimum temperature of the engine coolant temperature data at a second time period after the first time period;

determining, using the engine control unit, a temperature difference between the maximum temperature and the minimum temperature;

determining, using the engine control unit, a presence of a block heater using the temperature difference;

detecting, using the engine control unit, an engine malfunction, when the block heater is determined to not be present; and masking, using the engine control unit, the detection of the engine malfunction when the block heater is determined to be present.

2. The method of claim 1 wherein the step of determining, using the engine control unit, the presence of the block heater using the temperature difference includes comparing the temperature difference with a predetermined temperature threshold, and determining that the block heater is present when the temperature difference is greater than the predetermined temperature threshold.

3. The method of claim 2 wherein the predetermined temperature threshold is between approximately 1.25° C. and 3.125° C.

4. The method of claim 1 wherein the engine coolant temperature data includes temperature data from a start of an engine.

5. The method of claim 1 wherein the step of masking, using the engine control unit, the detection of the engine malfunction when the block heater is determined to be present includes masking a generation of a diagnostic trouble code.

6. The method of claim 1 wherein an initial engine coolant temperature data of the engine coolant temperature data is an average of a temperature when a user indicates that an engine should be started, and a start of the engine.

7. The method of claim 1 wherein the step of determining, using the engine control unit, the maximum temperature of the engine coolant temperature data at the first time period includes
   initializing a current maximum temperature;
   detecting a current temperature;
   comparing the current maximum temperature to the current temperature; and
   updating the current maximum temperature to the current temperature when the current temperature is greater than the maximum temperature.

8. The method of claim 7 wherein the step of determining, using the engine control unit, the minimum temperature of the engine coolant temperature data at the second time period after the first time period includes
   initializing a current minimum temperature;
   comparing a current minimum temperature to the current temperature; and
   updating the current minimum temperature to the current maximum temperature when the current maximum temperature is updated, and updating the current minimum temperature to the current temperature when the current temperature is less than the current minimum temperature.

9. The method of claim 8 further comprising
   determining that the current maximum temperature is the maximum temperature of the engine coolant temperature when a predetermined time period has lapsed; and
   determining that the current minimum temperature is the minimum temperature of the engine coolant temperature when a predetermined time period has lapsed.

10. A method for determining a presence of a block heater in an automobile comprising:
    detecting, using an engine coolant temperature sensor, engine coolant temperature data;
    determining, using an engine control unit, a maximum temperature of the engine coolant temperature data at a first time period;
    determining, using the engine control unit, a minimum temperature of the engine coolant temperature data at a second time period after the first time period;
    determining, using the engine control unit, a temperature difference between the maximum temperature and the minimum temperature;
    comparing, using the engine control unit, the temperature difference with a predetermined temperature threshold; and
    determining, using the engine control unit, that the block heater is present when the temperature difference is greater than the predetermined temperature threshold.

11. The method of claim 10 wherein the predetermined temperature threshold is between approximately 1.25° C. and 3.125° C.

12. The method of claim 10 wherein an initial engine coolant temperature data of the engine coolant temperature data is an average of a temperature when a user indicates that an engine should be started, and a start of the engine.

13. The method of claim 10 wherein
    the step of determining, using the engine control unit, the maximum temperature of the engine coolant temperature data at the first time period includes
       initializing a current maximum temperature,
       detecting a current temperature,
       comparing the current maximum temperature to the current temperature, and
       updating the current maximum temperature to the current temperature when the current temperature is greater than the maximum temperature; and
    the step of determining, using the engine control unit, the minimum temperature of the engine coolant temperature data at the second time period after the first time period includes
       initializing a current minimum temperature,
       comparing a current minimum temperature to the current temperature, and
       updating the current minimum temperature to the current maximum temperature when the current maximum temperature is updated, and updating the current minimum temperature to the current temperature when the current temperature is less than the current minimum temperature.

14. The method of claim 13 further comprising
    determining that the current maximum temperature is the maximum temperature of the engine coolant temperature when a predetermined time period has lapsed; and
    determining that the current minimum temperature is the minimum temperature of the engine coolant temperature when a predetermined time period has lapsed.

15. An automobile comprising:
    an engine including an engine block;
    a radiator hose connected to the engine block and configured to transport engine coolant;
    an engine coolant temperature sensor located in a path of the engine coolant and configured to detect engine coolant temperature data; and
    an engine control unit connected to the engine coolant temperature sensor and configured to:
       determine a maximum temperature of the engine coolant temperature data at a first time period,
       determine a minimum temperature of the engine coolant temperature data at a second time period after the first time period, determine a temperature difference between the maximum temperature and the minimum temperature, compare the temperature difference with a predetermined temperature threshold, and determine that a block heater is present when the temperature difference is greater than the predetermined temperature threshold.

16. The automobile of claim 15 wherein the predetermined temperature threshold is between approximately 1.25° C. and 3.125° C.

17. The automobile of claim 15 wherein an initial engine coolant temperature data of the engine coolant temperature data is an average of a temperature when a user indicates that an engine should be started, and a start of the engine.

18. The automobile of claim 15 wherein the engine control unit is further configured to:

initialize a current maximum temperature using the engine coolant temperature data, determine the current temperature from the engine coolant temperature data, compare the current maximum temperature to the current temperature, and update the current maximum temperature to the current temperature when the current temperature is greater than the maximum temperature.

19. The automobile of claim 18 wherein the engine control unit is further configured to:

initialize a current minimum temperature, compare a current minimum temperature to the current temperature, and update the current minimum temperature to the current maximum temperature when the current maximum temperature is updated, and update the current minimum temperature to the current temperature when the current temperature is less than the current minimum temperature.

20. The automobile of claim 18 wherein the engine control unit is further configured to:

determine that the current maximum temperature is the maximum temperature of the engine coolant temperature when a predetermined time period has lapsed, and determine that the current minimum temperature is the minimum temperature of the engine coolant temperature when the predetermined time period has lapsed.

* * * * *